United States Patent [19]

Zajaczkowski et al.

[11] Patent Number: 5,703,169
[45] Date of Patent: Dec. 30, 1997

[54] NON-CORROSIVE, LOW VOLATILES-CONTAINING PRESSURE SENSITIVE ADHESIVE

[75] Inventors: Michael J. Zajaczkowski, Yoe; Barbara A. Stutzman, Dover, both of Pa.

[73] Assignee: Adhesives Research, Inc., Glen Rock, Pa.

[21] Appl. No.: 590,603

[22] Filed: Jan. 24, 1996

[51] Int. Cl.[6] .................. C08F 290/04; C09J 151/00
[52] U.S. Cl. ........................... 525/309; 525/311
[58] Field of Search ......................... 525/309, 311

[56] References Cited

U.S. PATENT DOCUMENTS

| | | |
|---|---|---|
| 3,786,116 | 1/1974 | Milkovich et al. |
| 3,828,255 | 8/1974 | Schuon |
| 3,832,423 | 8/1974 | Milkovich et al. |
| 3,842,057 | 10/1974 | Milkovich et al. |
| 3,842,058 | 10/1974 | Milkovich et al. |
| 3,842,059 | 10/1974 | Milkovich et al. |
| 3,842,146 | 10/1974 | Milkovich et al. |
| 3,862,077 | 1/1975 | Schulz et al. |
| 3,862,098 | 1/1975 | Milkovich et al. |
| 3,862,101 | 1/1975 | Milkovich et al. |
| 3,862,102 | 1/1975 | Milkovich et al. |
| 3,879,494 | 4/1975 | Milkovich et al. |
| 3,989,768 | 11/1976 | Milkovich et al. |
| 4,085,168 | 4/1978 | Milkovich et al. |
| 4,551,388 | 11/1985 | Schlademan |
| 4,554,324 | 11/1985 | Husman et al. |
| 4,656,213 | 4/1987 | Schlademan |
| 4,693,776 | 9/1987 | Krampe et al. |
| 4,723,808 | 2/1988 | Hines |
| 4,871,812 | 10/1989 | Lucast et al. |

FOREIGN PATENT DOCUMENTS

WO96/08229  3/1996  WIPO.

Primary Examiner—Irina S. Zemel

[57] ABSTRACT

A novel high performance pressure sensitive adhesive composition is provided comprised of a phase separated graft copolymer comprised of a polymerized acrylic or methacrylic acid ester backbone having grafted thereon pendant polymeric moieties such as polystyrene or poly-alpha-methylstyrene. The composition is non-corrosive and has a low volatile content.

16 Claims, No Drawings

5,703,169

NON-CORROSIVE, LOW VOLATILES-CONTAINING PRESSURE SENSITIVE ADHESIVE

BACKGROUND OF THE PRESENT INVENTION

The present invention is directed to a pressure sensitive adhesive composition comprised of a polymerized acrylic or methacrylic acid ester backbone having grafted thereto pendant polymeric moieties.

Polymeric compositions are known which are comprised of backbone polymers having grafted thereto pendant polymeric moieties. The type of backbone polymer and graft polymeric moiety employed varies depending upon the desired characteristics of the end product. See, for example, U.S. Pat. Nos. 3,786,116; 3,832,423; 3,842,146; 3,862,077; 3,879,494; 3,928,255; 3,989,768; 4,085,168; 4,551,388; 4,554,324; 4,656,213; 4,693,776; 4,732,808; and 4,871,812 which disclose various types of such polymers which may or may not exhibit pressure sensitive adhesive properties.

Typical of the type of polymeric compositions disclosed in the above patents are compositions comprised of a backbone polymer such as an acrylic or methacrylic backbone polymer having attached thereto a graft polymer comprised of a polymerizable macromolecular monomer such as styrene or alpha-methylstyrene. See, for example, U.S. Pat. No. 4,554,324, among others, in this regard.

The acrylic pressure sensitive adhesives such as described in U.S. Pat. No. 4,554,324 may be made from an acrylic ester and a polar acrylic monomer. The polar acrylic monomer can be one or a mixture of acrylic acid, acrylamide, acrylonitrile, itaconic acid, etc. The acrylic ester can be any aliphatic ester of acrylic acid. Such monomers are typically polymerized free radically by solution, suspension or emulsion polymerization. The acrylate portion of the copolymer is generally present in a generally high concentration and renders the polymer tacky. The polar monomer increases the ability of the adhesive to bond to a surface.

While such polymeric compositions have been found to have utility as pressure sensitive adhesives, one area that has not heretofore been addressed with much success is providing high performance pressure sensitive adhesives which may be suitable for use in high temperature environments (i.e., environments where the temperature exceeds about 250° F.).

By way of example, the aerospace and automotive industries are experiencing an increased demand for adhesives with the capability to withstand temperature extremes of −200° F. to as high as 400° F. It has been found that typical acrylic pressure sensitive adhesives, while performing satisfactorily at temperatures as low as −45° F., fail at temperatures of about 150°–200° F. (and sometimes at lower temperatures) as the adhesive becomes too soft and is unable to retain acceptable adhesive properties. Attempts have been made to enhance the performance of such adhesives by cross-linking procedures.

Recent advances in the electronics industry also require the use of non-corrosive pressure sensitive adhesives due to the sensitivity of the electronic components. It is also desirable for the adhesive to have a low-volatiles content to minimize contamination during use of such adhesives during the manufacture of computer assemblies.

However, it has been found that the use of conventional polar monomer-containing pressure sensitive adhesives do not provide satisfactory performance at high temperatures. It has also been found that such adhesives exhibit undesirable corrosive properties as well as contain an undesirable volatiles content (thus leading to potential contamination during electronics manufacturing).

OBJECTS AND SUMMARY OF THE PRESENT INVENTION

It is accordingly an object of the present invention to provide a pressure sensitive adhesive composition which exhibits high performance properties.

It is further an object of the present invention to provide a pressure sensitive adhesive composition which retains sufficient adhesive strength at high temperatures.

It is still yet an object of the present invention to provide a pressure sensitive adhesive composition that has a low volatiles content.

It is still yet another object of the present invention to provide a pressure sensitive adhesive composition that is non-corrosive.

In accordance with the present invention, there is provided a normally tacky non-polar monomer-containing phase-separated graft copolymer exhibiting pressure sensitive adhesive properties comprised of a backbone polymer having a polymeric moiety grafted thereto, comprising (1) at least one A monomer consisting of a acrylic or methacrylic acid ester of a non-tertiary alcohol, said alcohol having from 1 to 3 carbon atoms, (2) at least one B monomer consisting of a monomeric acrylic or methacrylic acid ester of a non-tertiary alcohol, said alcohol having from 4 to 12 carbon atoms, (3) said graft is a polymeric moiety having a Tg greater than 20° C., and wherein the weight ratio of said at least one A monomer to said at least one B monomer ranges from about 1:2 to 2:1, and the average number of carbon atoms present in the alcohol portion of the total acrylic or (meth)acrylic acid esters of monomers A and B present ranges from about 2.5 to 3.5.

DETAILED DESCRIPTION OF THE INVENTION

The pressure sensitive adhesive graft copolymer of the present invention is comprised of a "hard" reinforcing graft polymeric moiety attached to or copolymerized with a "soft" backbone polymer to obtain a phase-separated adhesive graft copolymer. While graft copolymers are known which are comprised of a "soft" backbone polymer having an attached "hard" reinforcing graft polymer, such prior art graft copolymers fail to exhibit the desired high performance adhesive properties such as high strength in elevated temperature environments, with the graft copolymer also being non-corrosive and having a low volatiles content.

Specifically, the adhesive of the present invention comprises a phase-separated non-polar monomer-containing graft copolymer comprised of copolymerized monomers A and B to form a backbone polymer having a polymeric moiety grafted thereto, wherein monomer(s) A is a monomeric acrylic or methacrylic acid ester of a non-tertiary alcohol having from 1 to 3 carbon atoms, and monomer(s) B is a monomeric acrylic or methacrylic acid ester of a non-tertiary alcohol having from 4 to 12 carbon atoms.

The average number of carbon atoms present in the alcohol portion of the total acrylic or (meth)acrylic acid esters of monomers A and B present in the copolymer will be less than 4, and preferably about 2.5 to 3.5 (calculated on mole percent basis). Most preferably, the average number of carbon atoms is about 3.0.

Importantly, it has been found that the presence of a polar monomer(s) (such as acrylic acid) in pressure sensitive adhesives is a disadvantage to the extent that a non-corrosive adhesive is desired or that the volatiles content of the adhesive is to be minimized. The graft copolymer of the present invention thus contains no polar monomers. Any disadvantage which would normally result from the absence of the polar monomer is addressed by providing for a particular composition of A monomers based on the carbon atom content of the ester.

Exemplary A monomers include but are not limited to one or more of methyl(meth)acrylate, ethyl(meth)acrylate, n-propyl(meth)acrylate and iso-propyl(meth)acrylate. Such monomers are known to those skilled in the art.

Exemplary B monomers include but are not limited to esters of acrylic acid or methacrylic acid with non-tertiary alcohols such as 1-butanol, 1-pentanol, 2-pentanol, 3-pentanol, 2-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol, 1-dodecanol, etc. Such monomers are known to those skilled in the art.

The weight ratio of said A monomer(s) to said B monomer(s) in said copolymer ranges from about 1:2 to 2:1, and preferably is about 1:1.

The A monomer will preferably be present in the graft copolymer in an amount within the range of from about 20 to 65 percent by weight, based on the total weight of the copolymer, with any additional monomers employed (such as the B monomer) and the polymeric graft moiety comprising the remaining portion of the copolymer. Further, the graft polymeric moiety will generally comprise from about 2 to 30 percent by weight of the graft copolymer. Desirably, the graft copolymer consists solely of monomers A and B and graft polymeric moiety C.

The polymer graft is a polymeric moiety having a Tg greater than 20° C. and is preferably present in an amount of from 1.5 to 2.5 polymeric moieties per polymer backbone on average, and most preferably in an amount of 2 polymeric moieties per chain on average. The presence of the graft polymeric moiety within the noted range assists in enabling the copolymer to exhibit sufficient cohesion strength under conditions of use even in view of the presence in the copolymer of significant amounts of the A monomer which might otherwise reduce the cohesive strength of the copolymer. The amount of the A monomer employed may accordingly be optimized without otherwise diminishing the adhesive properties of the copolymer.

The molecular weight of the graft polymeric moiety must be sufficient to result in the formation of a "phase-separated" graft copolymer. Generally, the molecular weight (number average) of the graft polymeric moiety will range from 2,000 to 60,000. In order to enhance the high temperature resistance of the copolymer, the molecular weight of the graft polymeric moiety will preferably range from greater than 30,000 to 60,000. Preferably, the molecular weight is at least 40,000.

The graft copolymer of the present invention is characterized as being "phase-separated". That is, the backbone of the copolymer and the attached graft are incompatible and thus do not mix together to form a homogeneous phase. Instead, the copolymer backbone forms a continuous phase within which is dispersed the attached graft phase. The dispersed graft discontinuous phase thus acts to mechanically reinforce the continuous phase, thus inhibiting the flow of the continuous phase at an elevated temperature.

The polymer graft may be attached to the polymer backbone by conventional techniques such as (1) copolymerization with the respective monomers of the backbone polymer or (2) attachment to a preformed backbone polymer via a suitable functional group subsequent to formation of same by copolymerization of monomers A and B.

With regard to technique (1) which comprises the preferred technique, the graft copolymer of the present invention may be formed from copolymerized monomers A, B and C, wherein monomers A and B are as defined above and monomer C has the general formula X-Z wherein X is a group copolymerizable with said monomers A and B (preferably a vinyl group), and Z is a polymeric graft moiety having a Tg greater than 20° C., said moiety Z being essentially unreactive under copolymerization conditions, wherein said group X of said monomer C and said monomers A and B are copolymerized to form a polymeric backbone chain having pendant therefrom polymeric moiety Z.

A graft polymeric moiety may be prepared as a macromer and copolymerized with one or more A and B monomers which form the backbone polymer. See, for instance, the disclosure of U.S. Pat. No. 3,786,116, incorporated by reference in its entirety, in this regard.

Typical copolymerization techniques include but are not limited to conventional free radical initiated copolymerization techniques in the presence of a solvent. Suitable copolymerization temperatures range from about 20° C. to 150° C. for periods of time of from 2 to 24 hours until the desired degree of conversion occurs.

Upon completion of the polymerization process, the solvent is removed and a tacky acrylate copolymer results having an acceptable balance of tack and shear adhesive properties at high temperatures.

Depending upon the properties imparted to the backbone polymer as a result of the molecular weight of the particular graft employed, the resulting adhesive may need to be used in solution or emulsion form rather than as a melt adhesive. That is, if the molecular weight of the graft is sufficiently high, the resultant adhesive may be applied to a backing material or substrate in emulsion or solution form, with the water or solvent being removed upon application to the substrate.

With regard to the polymeric graft moiety portion of the adhesive composition, U.S. Pat. Nos. 3,786,116; 3,842,057; 3,842,058; 3,842,059; 3,862,098; 3,862,101, 3,862,102 and 4,554,324 disclose polymerizable macromers which are suitable for use as graft moieties on a backbone polymer as defined.

The polymeric moiety Z may be formed from a vinyl aromatic monomer such as styrene, alpha-methylstyrene, indene and p-tert-butylstyrene. However, the polymeric moiety Z may also be formed from vinyl toluene, acenaphthalene, acrylonitrile and methacrylonitrile; organic isocyanates including lower alkyl, phenyl, lower alkyl phenyl and halophenyl isocyanates; organic diisocyanates including lower alkylene, phenylene, and tolylene diisocyanates; lower alkyl and allyl methacrylates, including methyl and t-butyl methacrylates; lower olefins, such as ethylene, propylene, etc.; vinyl esters of aliphatic carboxylic acids such as vinyl acetate and vinyl benzoate; 2-oxazolines such as 2-ethyl-2-oxazoline; and vinyl unsaturated amides such as acrylamide, methylacrylamide, and N,N-di(lower alkyl) acrylamides such as N,N-dimethylacrylamide.

The selection of the specific polymerizable monomer for the polymer graft is not critical, since as the above listing suggests, a wide variety of monomers (and the resulting polymeric moieties) can be used with success as a polymeric graft in the claimed composition.

A variety of functional groups may be employed to attach the graft Z to the polymer backbone.

Exemplary functional groups include but are not limited to

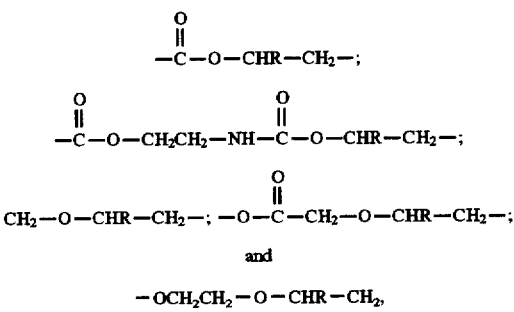

and $$-OCH_2CH_2-O-CHR-CH_2,$$

where R is a hydrogen atom or a lower alkyl group.

Various graft copolymers prepared according to the present invention are exemplified in Examples 1–2 below:

EXAMPLE 1

A polyacrylate polymer having a polystyrene graft (having a molecular weight of 13,000) is prepared by the following method. In a glass 1 liter reaction vessel the following charge stock was incrementally polymerized under a nitrogen atmosphere at 160°–165° F. over 8 hours with agitation:

| | |
|---|---|
| Ethyl acetate (solvent) | 254.44 grams |
| Butyl acetate (solvent) | 70.72 grams |
| Heptane (solvent) | 99.84 grams |
| 2-ethylhexyl acrylate (B monomer) | 132.79 grams |
| Butyl acrylate (B monomer) | 63.78 grams |
| Ethyl acrylate (A monomer) | 73.15 grams |
| Methyl acrylate (A monomer) | 96.00 grams |
| Polystyrene methacrylate macromer (graft) | 18.28 grams |
| Benzoyl peroxide (initiator) | 1.12 grams |

Note: The average number of carbons in the alcohol portion of the acrylic or (meth)acrylic acid esters of the A and B monomers is calculated to be 3.4.

EXAMPLE 2

A polyacrylate polymer having a polystyrene graft (having a molecular weight of 13,000) is prepared by the method of Example 1 from the following charge stock:

| | |
|---|---|
| Ethyl acetate (solvent) | 254.44 grams |
| Butyl acetate (solvent) | 70.72 grams |
| Heptane (solvent) | 99.84 grams |
| 2-ethylhexyl acrylate (B monomer) | 111.36 grams |
| Butyl acrylate (B monomer) | 55.68 grams |
| Ethyl acrylate (A monomer) | 96.00 grams |
| Methyl acrylate (A monomer) | 96.00 grams |
| Polystyrene methacrylate macromer (graft) | 24.96 grams |
| Benzoyl peroxide (initiator) | 1.12 grams |

Note: The average number of carbons in the alcohol portion of the acrylic or (meth)acrylic acid esters of the A and B monomers is calculated to be 3.1.

As discussed above, the graft copolymer of the present invention has particular utility as a pressure sensitive adhesive. As such, the composition may be employed alone or in combination with a suitable backing material in a manner known to those skilled in the art.

For instance, exemplary backing materials include but are not limmited to flexible or inflexible backing materials conventionally employed in the area of pressure sensitive adhesives such as creped paper, kraft paper, fabrics (knits, non-wovens, wovens), foil and synthetic polymer films such as polyethylene, polypropylene, polyvinyl chloride, poly (ethylene terephthalate) and cellulose acetate, as well as glass, ceramics, metallized polymeric films and other compatible sheet materials.

Such materials may be coated in any conventional manner with the adhesive composition of the present invention, such as by roll coating, spray coating, extrusion coating, co-extrusion coating, hot melt coating by use of conventional coating devices. When appropriate, the composition of the present invention may be applied as a solution and the solvent subsequently removed to leave a tacky adhesive residue on the backing material.

The coated backing material may take many forms, such as tapes, patches, strips, etc., with the choice and form of backing material being ultimately determined by the end use contemplated.

What is claimed is:

1. A normally tacky non-polar monomer-containing phase separated graft copolymer having pressure sensitive adhesive properties comprised of a backbone polymer having a polymeric moiety grafted thereto, comprising the reaction product of
   (1) at least one A monomer consisting of a monomeric acrylic or methacrylic acid ester of a non-tertiary alcohol, said alcohol having from 1 to 3 carbon atoms,
   (2) at least one B monomer consisting of a monomeric acrylic or methacrylic acid ester of a non-tertiary alcohol, said alcohol having from 4 to 12 carbon atoms,
   (3) said graft is a polymeric moiety having a Tg greater than 20° C. and a molecular weight ranging from about 2,000 to about 13,000, said polymeric moiety selected from the group consisting of poly(alpha-methylstyrene), poly(meth)acrylonitrile, polyvinyltoluene, polystyrene, polyindene, poly(t-butylstyrene), polyethylene, polypropylene, poly(vinyl acetate), poly(lower alkyl)methacrylate, poly(2-oxazoline), poly(meth)acrylamide and poly(N,N-di (lower alkyl)acrylamide); and wherein the weight ratio of said at least one A monomer to said at least one B monomer ranges from about 1:2 to 2:1, the average number of carbon atoms present in the alcohol portion of the total acrylic or (meth)acrylic acid esters of monomers A and B present ranges from about 2.5 to 3.5, and said graft polymeric moiety is present in an amount up to about 6.5 wt. % based on the total weight of the copolymer.

2. The copolymer of claim 1 wherein said graft polymeric moiety is poly(alpha-methylstyrene).

3. The copolymer of claim 1 wherein said graft polymeric moiety is poly(lower alkyl)methacrylate.

4. The copolymer of claim 1 wherein said graft is present in an amount of about 1.5 to 2.5 polymeric moieties per polymeric backbone chain on average.

5. The copolymer of claim 1 wherein the weight ratio of said at least one A monomer to said at least one B monomer is about 1:1.

6. The copolymer of claim 1 wherein said at least one B monomer comprises an ester of acrylic and methyacrylic acid with a non-tertiary alcohol selected from the group consisting of 1-butanol, 1-pentanol, 2-pentanol, 3-pentanol, 2-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol and 1-dodecanol.

7. The copolymer of claim 1 wherein the A monomer is present in the copolymer in an amount within the range of from about 20 to 65 percent by weight.

8. The copolymer of claim 1 wherein the average number of carbon atoms present in the alcohol portion of the total acrylic or (meth)acrylic acid esters of monomers A and B present in the copolymer is about 3.

9. The copolymer of claim 1 wherein said graft polymeric moiety is poly(meth)acrylonitrile.

10. The copolymer of claim 1 wherein said graft polymeric moiety is polyvinyltoluene.

11. The copolymer of claim 1 wherein said graft polymeric moiety is poly(t-butylstyrene).

12. The copolymer of claim 1 wherein said graft polymeric moiety is selected from the group consisting of polyethylene and polypropylene.

13. The copolymer of claim 1 wherein said graft polymeric moiety is polyvinylacetate.

14. The copolymer of claim 1 wherein said graft polymeric moiety is poly(meth)acrylamide.

15. The copolymer of claim 1 wherein said graft polymeric moiety is poly(N,N-di(lower alkyl)acrylamide).

16. The copolymer of claim 1 wherein said graft polymeric moiety is polystyrene.

* * * * *